US008712366B2

(12) United States Patent
Greene et al.

(10) Patent No.: US 8,712,366 B2
(45) Date of Patent: Apr. 29, 2014

(54) SYSTEM AND METHOD FOR DISTRIBUTING EMERGENCY DATA MESSAGES TO PUBLIC SAFETY ANSWERING POINTS IN A BALANCED MANNER

(75) Inventors: Lynn T. Greene, Olathe, KS (US); Amar N. Ray, Shawnee, KS (US); Robert J. Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 836 days.

(21) Appl. No.: 12/257,862

(22) Filed: Oct. 24, 2008

(65) Prior Publication Data

US 2010/0003954 A1 Jan. 7, 2010

Related U.S. Application Data

(60) Provisional application No. 61/078,123, filed on Jul. 3, 2008.

(51) Int. Cl.
*H04M 11/04* (2006.01)

(52) U.S. Cl.
USPC ............... 455/404.1; 455/404.2; 455/466

(58) Field of Classification Search
USPC ............. 455/404.1, 404.2, 456.1–457, 466
See application file for complete search history.

(56) References Cited

U.S. PATENT DOCUMENTS

| | | | |
|---|---|---|---|
| 5,339,351 A | 8/1994 | Hoskinson et al. | |
| 5,379,337 A * | 1/1995 | Castillo et al. | 379/45 |
| 5,497,149 A | 3/1996 | Fast | |
| 5,555,286 A | 9/1996 | Tendler | |
| 5,646,987 A * | 7/1997 | Gerber et al. | 379/266.02 |
| 5,937,038 A | 8/1999 | Bell et al. | |
| 6,137,877 A | 10/2000 | Robin et al. | |
| 6,240,285 B1 * | 5/2001 | Blum et al. | 455/404.1 |
| 6,317,049 B1 | 11/2001 | Toubia et al. | |
| 6,366,772 B1 | 4/2002 | Arnson | |
| 6,415,018 B1 * | 7/2002 | Antonucci et al. | 379/45 |
| 6,480,578 B1 | 11/2002 | Allport | |
| 6,526,125 B1 | 2/2003 | Lindsay et al. | |
| 6,591,112 B1 | 7/2003 | Siccardo et al. | |
| 6,642,844 B2 | 11/2003 | Montague | |
| 6,678,357 B2 | 1/2004 | Stumer et al. | |
| 6,690,932 B1 * | 2/2004 | Barnier et al. | 455/414.1 |
| 6,771,163 B2 | 8/2004 | Linnett et al. | |
| 6,839,022 B1 | 1/2005 | Benco et al. | |

(Continued)

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).

(Continued)

*Primary Examiner* — Allahyar Kasraian
(74) *Attorney, Agent, or Firm* — Swanson & Bratschun, L.L.C.

(57) ABSTRACT

A system and method for routing emergency data messages to public safety answering points may include identifying PSAPs local to the user and configured to receive emergency data messages. A determination of distribution of previous emergency data messages to the identified PSAPs may be performed. Based on the distribution of previous emergency data messages to the identified PSAPs, one of the identified PSAPs may be selected and the emergency data message may be routed thereto.

12 Claims, 6 Drawing Sheets

(56) References Cited

U.S. PATENT DOCUMENTS

| | | | |
|---|---|---|---|
| 7,026,925 | B2 | 4/2006 | Roche et al. |
| 7,079,627 | B2 | 7/2006 | Crago et al. |
| 7,095,733 | B1 | 8/2006 | Yarlagadda et al. |
| 7,098,787 | B2 | 8/2006 | Miller |
| 7,231,218 | B2 | 6/2007 | Diacakis et al. |
| 7,269,413 | B2 | 9/2007 | Kraft |
| 7,386,103 | B1 | 6/2008 | Chahal |
| 7,418,087 | B2 | 8/2008 | Luneau et al. |
| 7,496,189 | B2 | 2/2009 | Clarisse et al. |
| 7,679,505 | B1 | 3/2010 | Vallaire |
| 7,706,356 | B1 | 4/2010 | Olshansky et al. |
| 7,734,019 | B1 | 6/2010 | Terpstra |
| 7,773,975 | B2 | 8/2010 | Snapp et al. |
| 7,920,679 | B1 | 4/2011 | Naim et al. |
| 8,014,341 | B1 | 9/2011 | Ray |
| 8,102,986 | B1 | 1/2012 | McClintock et al. |
| 8,295,801 | B2 | 10/2012 | Ray et al. |
| 8,320,871 | B2 | 11/2012 | Ray et al. |
| 8,364,113 | B2 | 1/2013 | Ray et al. |
| 8,447,267 | B2 | 5/2013 | Ray et al. |
| 8,630,609 | B2 | 1/2014 | Ray et al. |
| 2001/0003843 | A1* | 6/2001 | Scepanovic et al. ............. 716/7 |
| 2001/0004588 | A1 | 6/2001 | Hong |
| 2001/0012379 | A1 | 8/2001 | Amemiya et al. |
| 2002/0016189 | A1 | 2/2002 | Sheynblat et al. |
| 2002/0054667 | A1 | 5/2002 | Martinez |
| 2002/0136363 | A1 | 9/2002 | Stumer et al. |
| 2003/0012344 | A1 | 1/2003 | Agarwal et al. |
| 2003/0063714 | A1 | 4/2003 | Stumer et al. |
| 2003/0109245 | A1 | 6/2003 | McCalmont et al. |
| 2003/0133450 | A1 | 7/2003 | Baum |
| 2003/0158668 | A1 | 8/2003 | Anderson |
| 2004/0072583 | A1 | 4/2004 | Weng |
| 2004/0090950 | A1 | 5/2004 | Lauber et al. |
| 2004/0176123 | A1 | 9/2004 | Chin et al. |
| 2004/0257273 | A1 | 12/2004 | Benco et al. |
| 2005/0002499 | A1 | 1/2005 | Ordille et al. |
| 2005/0003797 | A1 | 1/2005 | Baldwin |
| 2005/0070315 | A1* | 3/2005 | Rai et al. ............. 455/466 |
| 2005/0101287 | A1 | 5/2005 | Jin et al. |
| 2005/0111630 | A1 | 5/2005 | Potorny et al. |
| 2005/0123102 | A1 | 6/2005 | Beason et al. |
| 2005/0151642 | A1 | 7/2005 | Tupler et al. |
| 2005/0159132 | A1 | 7/2005 | Wright et al. |
| 2005/0169248 | A1* | 8/2005 | Truesdale et al. ............. 370/352 |
| 2005/0197096 | A1 | 9/2005 | Yang et al. |
| 2005/0201358 | A1 | 9/2005 | Nelson et al. |
| 2005/0209781 | A1 | 9/2005 | Anderson |
| 2005/0232225 | A1 | 10/2005 | Pelaez et al. |
| 2005/0265326 | A1 | 12/2005 | Laliberte |
| 2006/0009190 | A1 | 1/2006 | Laliberte |
| 2006/0043164 | A1 | 3/2006 | Dowling et al. |
| 2006/0052134 | A1 | 3/2006 | Sato |
| 2006/0072547 | A1 | 4/2006 | Florkey et al. |
| 2006/0133582 | A1* | 6/2006 | McCulloch ............. 379/45 |
| 2006/0217136 | A1 | 9/2006 | Bantukul et al. |
| 2006/0219542 | A1 | 10/2006 | Savir |
| 2006/0234726 | A1 | 10/2006 | Ashley et al. |
| 2006/0234727 | A1 | 10/2006 | Ashley et al. |
| 2006/0293024 | A1* | 12/2006 | Benco et al. ............. 455/404.2 |
| 2007/0003024 | A1 | 1/2007 | Olivier et al. |
| 2007/0201391 | A1* | 8/2007 | Belmonte et al. ............. 370/312 |
| 2007/0273519 | A1 | 11/2007 | Ichikawa et al. |
| 2007/0280428 | A1 | 12/2007 | McClelland |
| 2007/0287473 | A1* | 12/2007 | Dupray ............. 455/456.1 |
| 2008/0018452 | A1 | 1/2008 | McCarthy et al. |
| 2008/0026728 | A1 | 1/2008 | Snapp et al. |
| 2008/0064363 | A1 | 3/2008 | Salafia et al. |
| 2008/0070546 | A1 | 3/2008 | Lee |
| 2008/0144779 | A1 | 6/2008 | Ray et al. |
| 2008/0200143 | A1 | 8/2008 | Qiu et al. |
| 2008/0261557 | A1 | 10/2008 | Sim |
| 2008/0273670 | A1 | 11/2008 | Dickinson |
| 2008/0304630 | A1 | 12/2008 | Nguyen et al. |
| 2009/0047924 | A1* | 2/2009 | Ray et al. ............. 455/404.2 |
| 2009/0086932 | A1 | 4/2009 | Ray |
| 2009/0097474 | A1 | 4/2009 | Ray et al. |
| 2009/0144260 | A1 | 6/2009 | Bennett et al. |
| 2009/0186596 | A1 | 7/2009 | Kaltsukis |
| 2009/0197567 | A1 | 8/2009 | Ogram |
| 2009/0214011 | A1 | 8/2009 | Geldbach et al. |
| 2009/0227225 | A1 | 9/2009 | Mitchell et al. |
| 2009/0310602 | A1 | 12/2009 | Olshansky et al. |
| 2010/0002845 | A1 | 1/2010 | Zerillo et al. |
| 2010/0002846 | A1 | 1/2010 | Ray et al. |
| 2010/0003946 | A1 | 1/2010 | Ray et al. |
| 2010/0003947 | A1 | 1/2010 | Ray et al. |
| 2010/0003949 | A1 | 1/2010 | Ray et al. |
| 2010/0003955 | A1 | 1/2010 | Ray et al. |
| 2010/0003961 | A1 | 1/2010 | Ray et al. |
| 2010/0098062 | A1 | 4/2010 | Croak et al. |
| 2010/0107192 | A1 | 4/2010 | Sennett et al. |
| 2010/0142386 | A1* | 6/2010 | Snapp et al. ............. 370/250 |
| 2010/0215153 | A1 | 8/2010 | Ray et al. |
| 2010/0291894 | A1 | 11/2010 | Pipes |
| 2011/0014923 | A1 | 1/2011 | Krco et al. |
| 2011/0096769 | A1 | 4/2011 | Sim |
| 2012/0214437 | A1 | 8/2012 | Ray et al. |
| 2012/0309340 | A1 | 12/2012 | Ray |
| 2013/0012156 | A1 | 1/2013 | Ray et al. |
| 2013/0059560 | A1 | 3/2013 | Ray et al. |
| 2013/0102269 | A1 | 4/2013 | Ray et al. |
| 2013/0217355 | A1 | 8/2013 | Ray et al. |
| 2013/0237181 | A1 | 9/2013 | Ray |

OTHER PUBLICATIONS

Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

"At & T Wireless Unleashes the First and Only Wireless Messaging Device", PhysOrg.com, Sep. 30, 2004; available online at URL: <http://www.physorg.com/news1392.html> (12 pages).

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 12/272,238.

Non-Final Rejection mailed Apr. 1, 2011 for U.S. Appl. No. 12/257,655.

Non-Final Rejection mailed Mar. 3, 2011 for U.S. Appl. No. 12/257,416.

Non-Final Rejection mailed Mar. 17, 2011 for U.S. Appl. No. 12/257,640.

Non-Final Office Action date mailed Aug. 3, 2010 for U.S. Appl. No. 11/891,784.

Response filed Nov. 2, 2010 for U.S. Appl. No. 11/891,784.

U.S. Appl. No. 13/460,507; Non-Final Rejection dated Aug. 16, 2012; 28 pages.

U.S. Appl. No. 11/974,775; Corrected Notice of Allowability dated Aug. 31, 2012; 7 pages.

(56) References Cited

OTHER PUBLICATIONS

U.S. Appl. No. 12/257,574; Notice of Allowance dated Sep. 14, 2012; 25 pages.
U.S. Appl. No. 11/891,784; Issue Notification dated Sep. 26, 2012; 1 page.
U.S. Appl. No. 11/974,775; Issue Notification dated Sep. 26, 2012; 1 page.
U.S. Appl. No. 12/272,238; Issue Notification dated Oct. 3, 2012; 1 page.
U.S. Appl. No. 11/904,883; Non Final Rejection dated Oct. 11, 2012; 26 pages.
U.S. Appl. No. 12/257,641; Issue Notification dated Nov. 7, 2012; 1 page.
U.S. Appl. No. 11/891,784; Notice of Allowance dated Jul. 18, 2012; 27 pages.
U.S. Appl. No. 11/974,775; Notice of Allowance dated Jun. 12, 2012; 15 pages.
U.S. Appl. No. 12/168,668; Final Rejection dated Jul. 11, 2012; 29 pages.
U.S. Appl. No. 12/257,424; Final Rejection dated Jun. 13, 2012: 41 pages.
U.S. Appl. No. 12/257,641; Notice of Allowance dated Aug. 2, 2012; 17 pages.
U.S. Appl. No. 12/272,238; Notice of Allowance dated Jun. 8, 2012; 21 pages.
U.S. Appl. No. 11/430,232; Notice of Allowance dated May 13, 2011; 12 pages.
U.S. Appl. No. 11/430,232; Issue Notification dated Aug. 17, 2011; 1 page.
U.S. Appl. No. 11/640,714; Non-Final Rejection dated Sep. 15, 2011; 15 pages.
U.S. Appl. No. 11/640,714; Final Rejection dated Feb. 29, 2012: 17 pages.
U.S. Appl. No. 11/904,883; Non-Final Rejection dated Oct. 7, 2011; 19 pages.
U.S. Appl. No. 11/904,883; Final Rejection dated Apr. 27, 2012; 16 pages.
U.S. Appl. No. 12/257,424; Non-Final Rejection dated Jan. 31, 2012; 21 pages.
U.S. Appl. No. 12/257,424; Request for Continued Examination and Amendment dated Oct. 14, 2011; 8 pages.
U.S. Appl. No. 12/257,424; Final Rejection dated Jul. 14, 2011; 19 pages.
U.S. Appl. No. 11/974,775; Notice of Allowance dated Apr. 27, 2012; 12 pages.
U.S. Appl. No. 11/974,775; Non-Final Rejection dated Nov. 7, 2011; 19 pages.
U.S. Appl. No. 11/974,775; Non-Final Rejection dated May 10, 2011; 24 pages.
U.S. Appl. No. 12/168,668; Non-Final Rejection dated Feb. 6, 2012; 21 pages.
U.S. Appl. No. 12/070,909; Request for Continued Examination and Amendment dated Mar. 12, 2012; 9 pages.
U.S. Appl. No. 12/070,909; Final Rejection dated Jan. 10, 2012; 9 pages.
U.S. Appl. No. 12/070,909; Non-Final Rejection dated Aug. 16, 2011; 13 pages.
U.S. Appl. No. 12/257,574; Request for Continued Examination and Amendment dated Mar. 29, 2012; 7 pages.
U.S. Appl. No. 12/257,574; Final Rejection dated Dec. 29, 2011; 18 pages.
U.S. Appl. No. 12/257,574; Non-Final Rejection dated Jul. 6, 2011; 20 pages.
U.S. Appl. No. 12/257,624; Request for Continued Examination and Amendment dated Apr. 30, 2012; 8 page.
U.S. Appl. No. 12/257,624; Final Rejection dated Jan. 31, 2012; 14 pages.
U.S. Appl. No. 12/257,624; Non-Final Rejection dated Oct. 6, 2011; 19 pages.
U.S. Appl. No. 12/257,641; Notice of Allowance dated Feb. 2, 2012; 12 pages.
U.S. Appl. No. 12/257,641; Request for Continued Examination dated Apr. 30, 2012; 2 pages.
U.S. Appl. No. 12/257,641; Non-Final Rejection dated May 24, 2011; 17 pages.
U.S. Appl. No. 12/257,928; Request for Continued Examination and Amendment dated Feb. 22, 2012; 12 pages.
U.S. Appl. No. 12/257,928; Non-Final Rejection dated Jun. 8, 2011; 21 pages.
U.S. Appl. No. 12/272,238; Pre-Brief Appeal Conference Decision dated Jan. 17, 2012; 2 pages.
U.S. Appl. No. 12/272,238; Notice of Appeal and Pre-Brief Conference Request dated Dec. 28, 2011; 6 pages.
U.S. Appl. No. 12/272,238; Final Rejection dated Sep. 29, 2011; 12 pages.
U.S. Appl. No. 12/195,607; Issue Notification dated May 2, 2012; 1 page.
U.S. Appl. No. 12/257,574; Issue Notification dated Jan. 9, 2013; 1 page.
U.S. Appl. No. 13/150,725; Non-Final Rejection dated Nov. 26, 2012; 19 pages.
U.S. Appl. No. 13/460,507; Final Rejection dated Dec. 20, 2012; 14 pages.
U.S. Appl. No. 13/614,585; Notice of Allowance dated Dec. 12, 2012; 30 pages.
U.S. Appl. No. 12/391,503; Non Final Office Action dated Feb. 16, 2012; 9 pages.
U.S. Appl. No. 12/391,503; Final Rejection dated May 24, 2012; 19 pages.
Federal Standard 1037C: Telecommunications: Glossary of Telecommunication Terms. National Communication System. Technology and Standards Division. Washington, DC: General Services Administration, Information Technology Service, 1996. pp. vii, A-28, H-7, O.
U.S. Appl. No. 13/715,808; Non-Final Rejection dated Apr. 9, 2013; 36 pages.
U.S. Appl. No. 11/904,883; Non Final Rejection dated Apr. 19, 2013; 22 pages.
U.S. Appl. No. 13/460,507; Non-Final Rejection dated Apr. 26, 2013; 19 pages.
U.S. Appl. No. 13/614,585; Issue Notification dated May 1, 2013; 1 page.
U.S. Appl. No. 12/257,424; Non-Final Rejection dated Jul. 8, 2013; 46 pages.
U.S. Appl. No. 13/715,808; Notice of Allowance dated Sep. 13, 2013; 27 pages.
U.S. Appl. No. 13/847,388; Non-Final Office Action dated Jul. 17, 2013; 54 pages.
U.S. Appl. No. 12/257,624; Non-Final Rejection dated Oct. 16, 1913; 38 pages.
U.S. Appl. No. 12/391,503; Non Final Office Action dated Oct. 25, 2013; 23 pages.
U.S. Appl. No. 12/257,928; Non-Final Rejection dated Nov. 20, 2013; 35 pages.
U.S. Appl. No. 12/257,424 ; Final Rejection dated Nov. 21, 2013; 34 pages.
U.S. Appl. No. 13/847,388; Non-Final Office Action dated Dec. 9, 2013; 34 pages.
U.S. Appl. No. 13/460,507; Notice of Allowance dated Dec. 20, 2013; 20 pages.
U.S. Appl. No. 13/715,808; Issue Notification dated Dec. 24, 2013; 1 page.
U.S. Appl. No. 11/904,883; Non Final Rejection dated Feb. 5, 2014; 19 pages.

\* cited by examiner

SYSTEM AND METHOD FOR DISTRIBUTING EMERGENCY DATA MESSAGES TO PUBLIC SAFETY ANSWERING POINTS IN A BALANCED MANNER

CROSS REFERENCE TO RELATED APPLICATIONS

This Application claims priority to co-pending Provisional Patent Application Ser. No. 61/078,123 filed on Jul. 3, 2008; the entire teachings of which are incorporated herein by reference.

BACKGROUND OF THE INVENTION

Emergency 911 services have traditionally been performed by a user placing a telephone call to "911." Prior to mobile communications developing, users would dial "911" on landlines, and the public switched telephone network (PSTN) would route the call to a public safety answering point (PSAP) local to a street address of the landline telephone used to place the call.

With mobile and wireless telephones, the address of a user in an emergency call is unknown. To determine the address or location of the caller, various techniques for determining geographic positioning of the caller are performed, including using global positioning system (GPS) equipment and network assisted positioning by using triangulation, as performed by a communications network. The communications network identifies the emergency "911" call and, based on the location of the caller, routes the call to a local PSAP with respect to the location of the caller. Depending on the technology used by the PSAP, geographic coordinates may be sent to the PSAP. If the PSAP is configured with enhanced "911" or E-911 Phase II, then a local automatic location identification (ALI) database may be used to convert the geographic coordinates to address-based coordinates.

As mobile telecommunications have advanced, different forms of data messaging communications have been developed, including text messaging, instant messaging, photo messaging, and video messaging. To accommodate these new forms of communications, a few PSAPs have advertised specific telephone numbers that users can send a text message, for example, to notify emergency services of an emergency. The problem is that unless a user has saved the emergency telephone number in his or her mobile device, the user is unlikely to remember the telephone number or not have time to enter the telephone number during an emergency situation. Furthermore, if the user has traveled any sufficient distance from a PSAP that has a specific telephone for sending text messages, then the PSAP is no longer local to the user. PSAPs, especially those in metropolitan areas, can be overloaded with emergency calls, which causes people with emergencies to have to wait to speak with an operator.

SUMMARY

To overcome the problem of users not being able to send emergency data messages, such as text messages, to a common, easy to remember address that will be routed to a PSAP local to a user and to reduce waiting time for responses to users, the principles of the present invention provide for a system configured to determine a PSAP local to the user and route an emergency data message to the PSAP. The system may further be configured to manage distribution of emergency data messages to PSAPs so as to balance the number of emergency data messages sent to the PSAPs. The balancing may be based on volume and/or capacity of the PSAPs.

One embodiment of a system for routing emergency data messages to public safety answering points may include a memory, input/output (I/O) unit, and processing unit in communication with the memory and I/O unit. The processing unit may be configured to receive an emergency data message and cell code identifier indicative of a location of a wireless communications device of a user, identify PSAPs local to the user and configured to receive emergency data messages, and determine distribution of previous emergency data messages to the identified PSAPs. The processing unit may further be configured to select one of the identified PSAPs to route the emergency data message based on the distribution of previous emergency data messages to the identified PSAPs, and route the emergency data message to the selected PSAP.

One embodiment of a process for routing emergency data messages to public safety answering points may include identifying PSAPs local to the user and configured to receive emergency data messages. A determination of distribution of previous emergency data messages to the identified PSAPs may be performed. Based on the distribution of previous emergency data messages to the identified PSAPs, one of the identified PSAPs may be selected and the emergency data message may be routed thereto.

One process for distributing emergency data messages at a PSAP may include receiving an emergency data message at a PSAP. Distribution of emergency data messages to operator stations configured to handle a type of emergency data message of which the emergency data message is classified may be determined. One of the operator stations may be selected based on the determined distribution, and the emergency data message may be distributed to the selected operator station.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
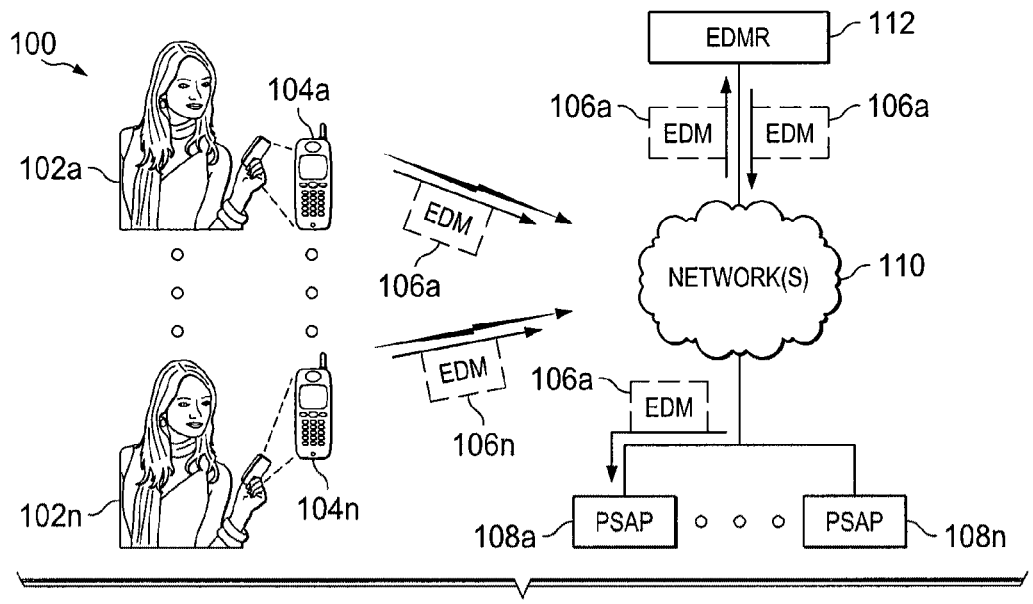
FIG. 1 is an illustration of illustrative network environment in which users of wireless communications devices are able to send emergency data messages via an emergency data message router to local public safety answering points.

With regard to FIG. 1, a network environment 100 provides users 102a-102n (collectively 102) of wireless communications devices 104a-104n (collectively 104), which may be mobile telephones, personal digital assistants (PDAs), wireless electronic games, multi-mode telephones, or other electronic devices capable of communicating emergency data messages (EDMs) 106a-106n (collectively 106) to public safety answering points (PSAPs) 108a-108n (collectively 108). As understood in the art, multiple wireless network operators may be concurrently providing wireless services using various operating frequencies and network protocols. Emergency data messages may include text messages, instant messages (IMs), emails, photo messages, video messages, and the like. The emergency data messages 106 may be communicated to an emergency network address, such as Internet Protocol (IP) domain routing address "emergency.org," "911.911," or any other network address, by users 102 from the wireless communications devices 104. In one embodiment, the emergency data messages 106 may be generated and communicated by activating a single emergency data message button, either a hard-button or a soft-button, that causes the wireless communications devices 104 to generate a pre-established data message.

A preestablished or pre-formatted data message, such as a text message, may include information associated with a respective user, such as a network identification number (NID), mobile electronic device identification number (MEID), which is commonly called a cell code identifier, user's name, telephone number, home or work address, secondary contact number, or any other information associated with a user such that an operator at a PSAP or emergency personnel (e.g., police) may have information of the user if he or she is unable to be immediately located. In addition, the emergency data messages 106 may be appended with a checksum, such that the message can be validated to be received without error. It should be understood that various checksum algorithms may be employed and may or may not include capabilities to detect and correct errors. Alternatively, a "free-form" data message, such as a text message, may be sent to an emergency network address, but the user may run the risk of being incomplete or too "cryptic" due to being in an emergency situation or using abbreviations unfamiliar to PSAP operators. The emergency data message may be communicated via the network(s) 110 to a PSAP local to the respective user. As not all wireless communications devices are configured to generate preformatted emergency data messages, a user may generate and communicate a freeform emergency data message (e.g., text message, email, instant message, image message) to a network address, such as Internet domain name "911.911," for routing to a PSAP local to the user. A freeform emergency data message is any data message that is addressed and communicated to a network address for routing to a PSAP local to the user.

The networks 110 may include mobile networks, wireless communications networks, Internet, public switched telephone network (PSTN), or any other network capable of communicating an emergency data message to the PSAPs 108. As shown, an emergency data message 106a is communicated from the wireless communications device 104a via the network(s) 110 to an emergency data message router (EDMR) 112, which may be located at an emergency message address that is configured to determine a PSAP 108a that services a geographic area in which the user 102a is currently located.

The emergency data message router 112 may be a centralized router associated with an address to which the emergency data messages 106 are communicated or may be configured as distributed routers that handle incoming emergency data messages from respective regions of the country or world. The emergency data message router 112 may receive data communicated with an emergency data message that may be used to identify a geographic location, geographic area, cell site, or otherwise, as further described herein. In addition, the emergency data message router 112 may determine which of the PSAPs local to a user sending an emergency data message has communications capabilities for handling the type of emergency data message (e.g., text message) being sent. In one embodiment, the EDMR 112 may recognize that a PSAP can only accept certain types of message formats based, and may perform a lossless message format translation from one format to another based upon this recognition.

Figure 2:
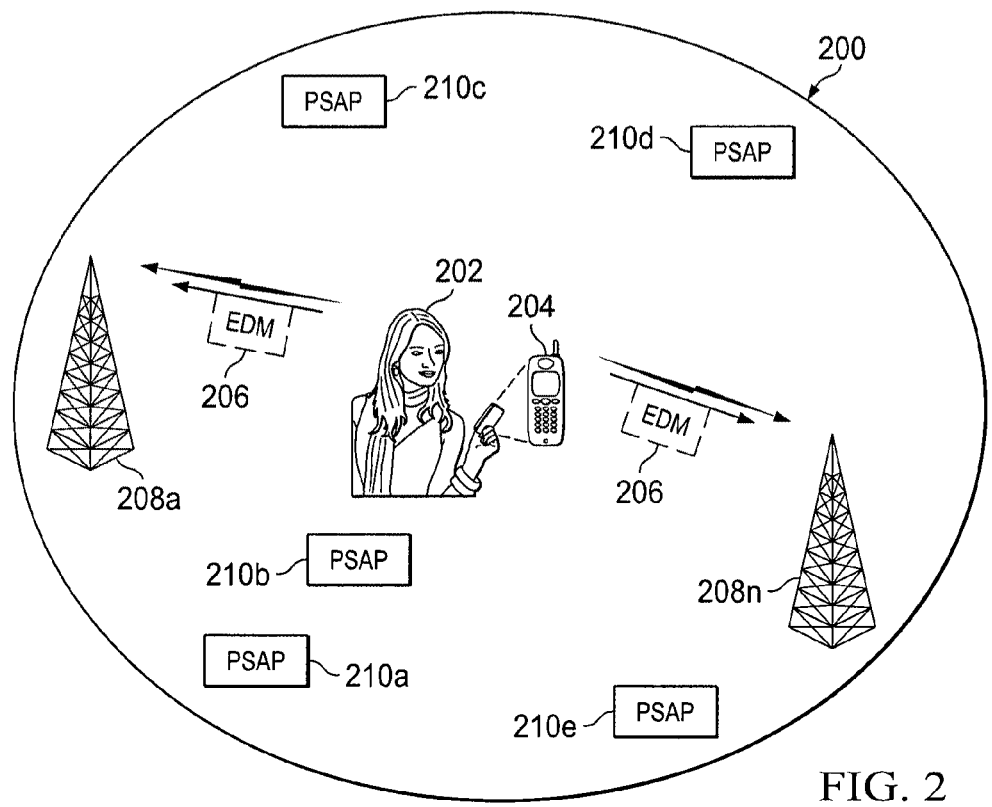
FIG. 2 is an illustration of a user of a wireless communications device operating in a cell site in which multiple PSAPs have different communications capabilities.

With regard to FIG. 2, a cell site 200 operates to handle wireless communications calls and messages communicated from users within the cell site 200. As shown, a user 202 using a wireless communications device 204 communicates an emergency data message 206 to any cell tower 208a-208n (collectively 208) or other wireless access points within the range of the wireless communications device 204.

Each of the PSAPs 210 may have different communications capabilities. For example, while all the PSAPs have voice capabilities, some PSAPs may be more limited. Not all PSAPs will have text messaging capabilities, image viewing capabilities (e.g., photographs and videos), e-mail capabilities, and so forth. Depending on the type of emergency data message sent by the user 202 using the wireless communications device 204, which may have a wide variety of messaging capabilities, the emergency data messages 206 may be communicated to a PSAP that is local to the user (e.g., within the cell site 200) and has communications capabilities that are compatible with the emergency data messages (e.g., includes the ability to receive text messages through a mobile or other communications system, as understood in the art).

Figure 3:
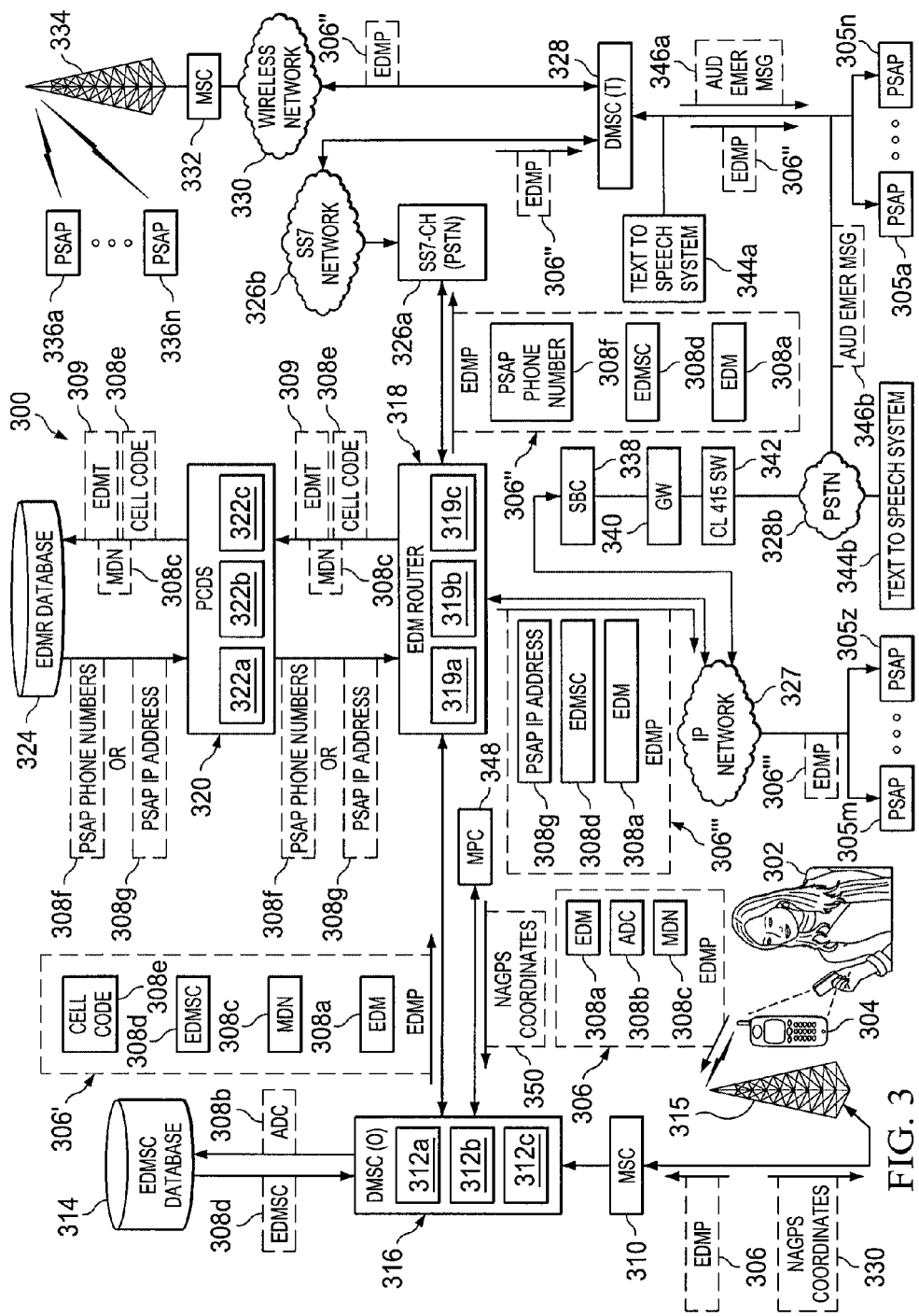
FIG. 3 is a block diagram of an illustrative communications network environment configured to receive and process emergency data messages to PSAPs local to users who sent the emergency data messages.

With regard to FIG. 3, a network environment 300 is configured to enable a user 302 using a wireless communications device 304 to communicate emergency data messages to public safety answering points 305a-305n and/or 305m-305z (collectively 305). The PSAPs 305a-305n are representative of PSAPs that are capable of receiving text messages and telephone calls, and the PSAPs 305m-305z are PSAPs that are capable of receiving emergency data messages in the form of e-mail messages or other data format that is generally communicated over IP networks, as well as telephone calls. It should be understood that the PSAPs 305a-305n and 305m-305z may overlap by one or more PSAP having multiple types of communications capabilities. It should be understood that the communications capabilities of the PSAPs 305 may vary over time as technology advances.

The user 302 may send an emergency data message package 306 by making an emergency data message request on the wireless communications device 304. In making the emergency data message request, the user may select a single button, multiple buttons, or use a menu system to cause the wireless communications device 304 to generate and communicate an emergency data message (EDM) 308a. In one embodiment, an emergency data message 308a may be a pre-established text message that includes NID, MEID, contact information of the user, such as telephone number, home address, name, and other contact information, and insert geographic coordinates, such as GPS coordinates, that identify a location at which the user 302 is located at the time the user makes the emergency data message request. Alternatively, the emergency data message 308a may be a conventional data message (e.g., text message, instant message, or email) that a user initiates without a template or pre-established data being initially generated. The emergency data message package (EDMP) 306 may include the emergency data message 308a that may include up to 160 characters, in the case of an SMS message, abbreviated dialing code 308b, and mobile directory number (MDN) 308c.

The abbreviated dialing code 308b may be an alphanumeric code that is stored in the wireless communications device 304 and communicated with the emergency data message 308a to a mobile switching center (MSC) 310. The abbreviated dialing code 308b may be established by a service provider and/or manufacturer of the wireless communications device 304. The abbreviated dialing code 308b may essentially be any code, typically a ten digit code, that indicates that an emergency data message is being communicated from the wireless communications device 304. As an analogy, on the voice network there are many different types of abbreviated dialing codes, including "411" for placing an information call to a service provider, "911" for placing an emergency telephone call, and so on. As an example, an abbreviated dialing code for indicating that an emergency data message is being communicated may be "0000000SOS." Alternatively, if different types of emergency data messages are available for selection using a menu system on the wireless communications device 304, then different abbreviated dialing codes may also be selectively communicated to represent the selected emergency data message that is being sent. For example, the abbreviated dialing codes may include "000000SOS1," "000000SOS2," "000000SOS3," and so on to indicate different types of emergencies and certain content in the emergency data messages. The different types of emergencies may include medical condition, automobile accident, fire, assault, or any other type of emergency data message that may be helpful to an operator at a PSAP for dispatching emergency personnel.

For SMS messages, when the mobile switching center 310 receives the emergency data message 306, the mobile switching center 310 routes the emergency data message 306 to an originator data message service controller (DMSC(O)) 316. The DMSC(O) 316 utilizes a process executed by a processing unit 312a that determines whether the emergency data message 308a is, in fact, an emergency data message being communicated to a PSAP or a standard data message, such as a text message being communicated between peers. In addition, the MSC 310, DMSC(O) 316, or other network node may perform additional functions, such as initiate continuous geographic coordinate or geo-coordinate updates to the PSAP, if the emergency data message 306 is determined to be inclusive of certain content, such as hostage situation, by inspecting the abbreviated dialing code or other data.

The DMSC(O) 316 may also include a memory 312b, which may include random access memory, disk drive memory, or other memory as understood in the art, that stores data and software and input/output unit 312c that communicates data over a network and with other local devices. In one embodiment, the memory 312b may store abbreviated dialing codes so as to be used by the processing unit 312a in determining whether the emergency data message 308a is, in fact, a priority message. In doing so, the processing unit 312a processes or parses the emergency data message package 306 to determine whether an abbreviated dialing code 308b is included or otherwise communicated with the emergency data message 308a. If it is determined that the emergency data message is a priority message, then the processing unit 312a may communicate the abbreviated dialing code 308b to an emergency data message short code database (EDMSC DB) 314, which may be local or remote from the DMSC(O) 316.

The emergency data message short code database 314 may include a listing (see TABLE I) of abbreviated dialing codes and short codes associated therewith so as to return an emergency data message short code 308d to the DMSC(O) 316 that is indicative of the type of emergency data message 308a. The emergency data message short code 308d may be alphanumeric data and utilized by other nodes in the network environment 300 for prioritizing processing of the emergency data message package 306', which includes the emergency data message 308a (e.g., text), mobile directory number 308c, emergency data message short code 308d, and cell code 308e. The cell code or cell code identifier 308e is a data value associated with a cell of a mobile communications system and is typically determined by the mobile switching center 310 by determining to which cell tower the wireless communications device 304 is communicating.

The DMSC(O) 316 processes the emergency data message 306' for routing to emergency data message router 318. This processing may include message decoding of the abbreviated dialing code 308b and initiating additional action, such as notifying alternative wireless carriers to provide continuous geo-coordinate updates to the PSAP, if possible. In addition, the DMSC(O) 316 may perform message format translation from one format to another format. In another embodiment, for SMS messages, the function described above could be performed at the MSC 310 or SMSC (not shown), which would avoid modification to the MSC 310 or inclusion of the DMSC(O) 316.

TABLE I

| ADC | EDM Short Code | TYPE |
| --- | --- | --- |
| SOS0 | EMERGENCY0 | Default |
| SOS1 | EMERGENCY1 | Medical |
| SOS2 | EMERGENCY2 | Automobile Accident |
| SOS3 | EMERGENCY3 | Fire |
| SOS4 | EMERGENCY4 | Assault |

In the case of Instant Messaging, when the mobile device initiates an emergency IM, the IM is rerouted to the DMSC (O) 316 instead of the user's normal IM service provider's servers. The DMSC(O) 316 perform functions previously defined to determine the proper PSAP. For email, the addressee domain name is the emergency indicator. In one embodiment, the user's email provider routes the message to the appropriate DMSC(O) based on that addressee's Internet Protocol Domain Name Service (DNS) resolution. This DMSC(O) 316 may be a clearinghouse type of DMSC(O). In another embodiment, software on the device intercepts the email and reroutes it to the carrier's DMSC(O) for processing. If the DMSC(O) 316 determines it is not an emergency, it forwards to the appropriate email provider's system.

The emergency data message router 318 may execute a process on processing unit 319a that processes the emergency data message package 306' to communicate the cell code 308e to a PSAP capabilities defining system (PCDS) 320. In an alternative embodiment, the emergency data message router 318 and PCDS 320 are configured on a single computing system. The processing unit 319a may include one or more processors. Other computing and communications components, such as a memory 319b for storing data and software, input/output (I/O) unit 319c for communicating data over a network, may be included in the emergency data message router 318, as understood in the art. The PCDS 320 may execute a process on a processing unit 322a for determining PSAPs local to the user 302 and communications capabilities of PSAPs that are determined to be local to the user 302. The PCDS 320 may also include a memory 322b for storing memory and software and input/output unit 322c for communicating data over a network and/or with the EDM router 318. Determination may be made on information provided as part of the message including geo-coordinates of the sending device and geo-coordinates of the PSAPs using an algorithm to determine the nearest emergency service provider as per the emergency type.

In determining local PSAPs, the PCDS 320 may receive the mobile directory number 308c and cell code 308e and use a three-digit exchange code portion of the MDN 308c and/or cell code 308e to determine whether there is a PSAP local to the exchange code of the wireless communications device 304 by matching the three-digit exchange code of the MDN 308c and exchange code associated with the PSAPs. However, because the wireless communications device 304 is mobile and may be utilized outside the exchange area in which the wireless communications device 304 is initially registered, a PCDS 320 may or may not use the MDN 308c in determining a local PSAP to the user 302. For example, if the exchange code digits of the MDN 308c are foreign to an area in which the wireless communications device 304 is operating, then the PCDS 320 may be limited to using the cell code 308e to determine PSAPs that are local to the user 302. A combination of both the cell code 308e and exchange code may be used to determine local PSAPs. Alternatively, a determination may be made on information provided as part of the message including geo-coordinates of the sending device and geo-coordinates of the PSAPs using a mathematical vector algorithm or equivalent database query to determine the nearest emergency service provider as per the emergency type.

An emergency data message router database 324 may be in communication with the PCDS 320 to enable the PCDS 320 to look up PSAPs that are (i) local to the user 302 and (ii) have particular communications capabilities. The emergency data message router database 324 may be local to or remotely located from the PCDS 320. The communications capabilities may include the ability to receive text messages, instant messages, e-mails, photo messages, or video messages, as understood in the art. In determining the communications capabilities, the PCDS 320 and/or EDMR DB 324 may determine an address associated with a local PSAP, and the communications capabilities may be identified by the type of address (e.g., telephone number or IP address) or position of the address within the EDMR DB 324.

With each of these communications capabilities, the PSAPs have access to communications network(s) that are capable of communicating compatible emergency data messages of those types. It should be understood that the PCDS 320 and process being executed by the processing unit 322a may identify the type of emergency data message 308a that is being communicated and determine which PSAP local to the user 302 is capable of receiving that type of emergency data message. For example, if the emergency data message 308a is a text message, then a PSAP that is both local to the user and has capabilities of receiving emergency text messages may be determined to be most compatible with the emergency data message that is being communicated to request emergency assistance.

Although a PSAP that is closest to the user 302 may be considered ideal from an emergency personnel deployment perspective, because emergency data messages are being communicated by the user 302, and many PSAPs are not equipped to handle certain types of communications, the PCDS 320 may determine whether any PSAPs local to the user 302 are compatible with the emergency data message 306' that is being communicated before selecting the PSAP to route the emergency data message 308a. In other words, an emergency data message sent in its original form may be best to provide to a PSAP in that same form to avoid loss of data, corruption of the data, or misinterpretation by a PSAP operator. Any translations that may be performed to convert from one format to another are lossless; meaning no loss of any information.

To determine whether a PSAP has compatible communications, the emergency data message router 318 may determine, by examining a packet header or other data field(s), generate, and communicate an emergency data message type (EDMT) 309, which may be an alphanumeric value and is indicative of the type of emergency data being communicated (e.g., text, image, instant message, email). The PCDS 320 may use and/or communicate the EDMT 309 to the emergency data message router database 324 to identify any PSAPs local to the user that have communications capabilities that are compatible with the emergency data message type. If, for example, it is determined by the PCDS 320 that there are no PSAPs local to the user 302 that are compatible with receiving text messages based on the EDMT 309, then the PCDS 320 may determine that an emergency text message may be communicated to a local PSAP by sending the PSAP to a text-to-speech translator for converting the text-to-speech for audible communication to the local PSAP. The emergency data message router database 324, in response to locating a local PSAP with the most compatible communications capabilities, may return a PSAP telephone number 308f or PSAP IP address 308g, depending on the communications network that is available to communicate the type of emergency data message received from the wireless communications device 304. The PSAP telephone number 308f may be used for a text message or image message to be communicated to the PSAP and the PSAP IP address 308g may be used for communicating an email to the PSAP, for example. Other types of message translations may be employed as available.

Depending on whether the selected PSAP is to be communicated via an SS7 clearinghouse (CH) 326a and SS7 network 326b, IP network 327, wireless communications network 330 (e.g., mobile network), or any other communications system or network, the emergency data message router 318 may communicate the emergency data message 308a to the telephone number or address of the selected PSAP. If the emergency data message 306" is to be communicated over the SS7-CH 326a and network 326b, then the PSAP telephone number 308f is communicated with the emergency data message short code 308d and emergency data message 308a to the PSAP 305n that is determined to be local to the user 302 and capable of receiving the emergency data message 308a having the appropriate communications network connection and software interface for displaying the emergency data message 308a.

The emergency data message package 306" is communicated via a terminating data message service controller (DMSC(T)) 328 for routing to the appropriate PSAP via the PSTN 329a or wireless communications network 330. If the emergency data message 308a is a text message or image, then the DMSC(T) 328 may route the EDMP 306" via the wireless communications network 330, including a mobile switching center 332 and base station 334, to one of the PSAPs 336a-336n (collectively 336). The PSAPs 336 may be limited to wireless or mobile communications or have multiple communications capabilities. It should be understood that although the PSAPs 305a-305n, 305m-305z, and 336a-336n are shown to be in communication with different communications networks, that each may be in communication with one or more of the communications network and have separate devices that communicate with respective communications networks or have a device that is capable of receiving and/or consolidating emergency messages from different communications networks.

If, alternatively, the emergency data message 308a is an email rather than a text or photo message, then the PCDS 320 determines a PSAP local to the user 302 that is configured to receive emails and routes the emergency data message package 306''' via the IP network 327 to a PSAP 305m that is local to the user 302 and configured to receive and display emails. In determining the appropriate PSAP, the PCDS 320 accesses the emergency data message router database 324 to look-up a local PSAP with email communications capabilities and receives the PSAP IP address 308g from the emergency data message router database 324 for communicating the emergency data message package 306''' to the PSAP IP address 308g at the PSAP, in this case PSAP 308m.

A communication link between the IP network 327 and PSTN 329b may be formed by including a session border controller 338, gateway 340, and class 4/5 telephony switch 342, or parts thereof, as understood in the art, so that emergency data messages may be routed via the IP network 327 for distribution to a PSAP that is limited to communicating via the PSTN 329b, as may be found in rural areas of the country. Because different portions of the PSTN 329b may be configured to handle IP messaging from the IP network 327, the PSTN 329b is shown separately from the PSTN 329a. Because the emergency data message 308a includes text, if the emergency data message 308a is communicated over the PSTN 329a or the IP network 327 and PSTN 329b, the text is converted by a text-to-speech system 344a or 344b, respectively, to generate an audible emergency message 346a or 346b, respectively. The decision and ability to route the emergency data message 308a via the SS7 network 326b or IP network 327 may be dependent upon the configuration of the EDM router 318. However, because the emergency data message 308a is to be expedited to a PSAP, other factors, such as network congestion, selected PSAP communications capabilities, or other factors, may be used by the EDM router 318 to select which network path to communicate the emergency data message 308a. In addition, the EDM router 318 may raise the priority level on the IP packet if quality of service capabilities are available in the network.

More specifically, the emergency data message router database 324 may include a database or table that stores and manages, and/or also performs algorithm calculations to arrive at, PSAP cell codes, capabilities, and network addresses so that the PCDS 320 may select an appropriate PSAP to communicate the emergency data message based on a number of factors. The factors may include distance from the user, type of emergency data message, network connection, which may be indicated by whether a network address is available, geographic coordinates, and so forth. An illustrative listing of a table that may be managed and operated by the emergency data message router database 324 is shown in TABLE II below.

TABLE II

| PSAP | PSAP Cell Code | Exchange Codes | Capabilities | Network Addresses | | |
|---|---|---|---|---|---|---|
| | | | | Voice (PSTN) | Text/Image (Mobile Network) | Email (IP Address) |
| Easton | 3719 | 405 | Voice | 972-405-1234 | — | — |
| Weston | 3720 | 826, 259 | Voice, Text | 972-826-1234 | 972-259-9876 | — |
| Central 1 | 3721, 3729 | 408 | Voice | 214-408-9876 | — | — |
| Central 2 | 3721, 3730 | 528, 526 | Voice, Text | 214-528-1234 | 214-526-5555 | — |
| Central 3 | 3721, 3729 | 528, 259 | Voice, Text, Image, Email | 214-528-5678 | 214-259-5555 | 127.37.17.38 |
| South 1 | 3722, 3741 | 699 | Voice | 817-699-1234 | — | — |
| South 2 | 3722, 3733 | 347, 283 | Voice, Text | 817-347-1234 | 817-283-5555 | — |
| North | 3723 | 277, 623 | Voice, Text, Image, Email | 972-277-1234 | 972-623-5555 | 128.94.1.23 |

The EDM router 318, PCDS 320, EDMR DB 324 or combination thereof may route or reformat, re-address, and/or route the emergency data message 308a. If a determination is made that a PSAP does not have a compatible communications capability as an emergency data message, then the emergency content of the emergency data message may be reformatted, re-addressed, and re-routed. If the emergency data message type matches the communications capabilities of a selected local PSAP, then the emergency data message 308a may be routed accordingly.

As an example, if the emergency data message type of the emergency data message 308a is a text message being communicated using SMS and the communications capabilities of a local PSAP includes text messaging, then the emergency data message package 306" is routed to the SS7-CH 326a for delivery to a wireless device at one of the PSAPs 305a-305n. If the communications capabilities of a local PSAP includes instant messaging without text messaging, then the emergency data message 308a is reformatted and re-addressed to comply with instant message protocols and sent to an instant message client at the PSAP via either the SS7-CH 326a and network 326b or IP network 327, depending on a network address (e.g., telephone number or IP address) of the PSAP. If the communications capabilities of a local PSAP includes email, then the emergency data message 308a may be reformatted and re-addressed to comply with email protocols and sent to a PSAP email client with a priority indication, either the emergency data message short code 308d or otherwise. If the communications capabilities of a local PSAP is limited to voice only, then the emergency data message 308a is communicated to the text-to-speech system 344, as understood in the art, via the DMSCM 328 for synthesizing speech of content of the emergency data message 308a and communication to the local PSAP. Alternatively, if the message format is not reformattable, nor is easily translated to speech, then the message may be routed to an alternative PSAP.

The PCDS 320 may further be configured to determine which of the PSAPs identified to be local to the wireless communications device and configured to handle emergency data messages of an emergency data message type of which the emergency data message 308a is classified to communicate the emergency data message 308a and the associated data. In determining which PSAP to communicate the emergency data message 308a, the processing unit 322a of the PCDS 320 may access historical information stored in the memory 322b that is indicative of emergency data messages previously sent to the identified PSAPs. The information may include statistical and/or aggregate information that indicates a total number of emergency data messages that have been sent to each of the PSAPs over a given time period, such as within the past hour, eight hours, day, or week. The historical information may further include a record of how may operator stations or telecommunicator positions are configured to receive different emergency data message data types located at each of the PSAPs.

In determining which PSAP to send the emergency data message 308a, the processing unit 322a of the PCDS 320 may use the historical information so as to balance the number of emergency data messages sent to each of the identified PSAPs. A variety of different selection techniques may be used in selecting which PSAP to send the emergency data message 308a. For example, the processing unit may balance the number of emergency data messages communicated to each of the identified PSAPs by volume or total number, by volume over a given time period (e.g., emergency data messages per hour), or by average per operator station at each of the identified PSAPs (e.g., emergency data messages per operator station). Alternatively, the PCDS 320 may select an identified PSAP based on historical capacity or throughput (e.g., total number of emergency data messages processed per hour). It should be understood that any number of different measurement standards may be utilized to determine which of the identified PSAPs to send the emergency data message 308a.

The PCDS 320 may use the historical information in conjunction with location to determine an optimal PSAP to route the emergency data message 308a. The determination may include determining distribution of previous emergency data messages sent to PSAPs identified the PCDS to be local to the user and configured to receive emergency data messages of the type being routed. For example, the PCDS 320 may determine an average amount of time that it takes for each of the identified PSAPs to process or otherwise dispose of emergency data messages and compare that statistic to distance of the identified PSAPs from the user. A computation may be made as to whether it will take more time for closer PSAP to the user to process the emergency data message 308a than a PSAP that is farther from the user, thereby providing for a normalization of expected process time and distance between the different identified PSAPs. For example, a PSAP may be located 10 miles from the user, but have an expected process time of 1 minute, whereas a PSAP located 2 miles from the user may have an expected process time of 15 minutes, thereby making the PSAP farther from the user a better choice than the closer PSAP.

TABLE III is an illustrative table showing historical information of PSAPs. The historical information may include EDMs sent in the past hour, average processing time per EDM, and number of operator stations at the PSAPs. The PCDS 320 may utilize the statistical information and aggregate information to make a determination to distribute the emergency data messages. For example, if a user in cell code 3721, which is covered by both Central 1 and 2 PSAPs, the system may select the Central 2 PSAP to handle the call as (i) only 28 emergency data messages have been sent to that PSAP in the past hour, which is below average, (ii) the capacity (i.e., operator stations) is higher than the Central 1 PSAP, and (iii) the average processing time per emergency data message is lower than Central 1 PSAP. It should be understood that a variety of different statistical parameters may be stored at the PCDS to manage distribution of emergency data messages to PSAPs. It should also be understood that a variety of different algorithms may be utilized to select a PSAP to send an emergency data message. Although specific classifications of emergency data messages are not shown, the historical information shown in TABLE III may be expanded to show more resolution based on different types of emergency messages (e.g., text, email, instant message), as different emergency message types may take more time to process than others due to volume, interface, operator skill, etc.

TABLE III

| PSAP | PSAP Cell Code | Exchange Codes | Avg EDMs Sent per Hour | EDMs Sent in Past Hour | Average Processing Time per EDM (mins) | Operator Stations |
| --- | --- | --- | --- | --- | --- | --- |
| Easton | 3719 | 405 | 27 | 37 | 1.7 | 1 |
| Weston | 3720 | 826, 259 | 38 | 43 | 2.4 | 3 |
| Central 1 | 3721, 3729 | 408 | 57 | 66 | 3.6 | 6 |
| Central 2 | 3721, 3730 | 528, 526 | 85 | 28 | 1.2 | 8 |

Figure 4:
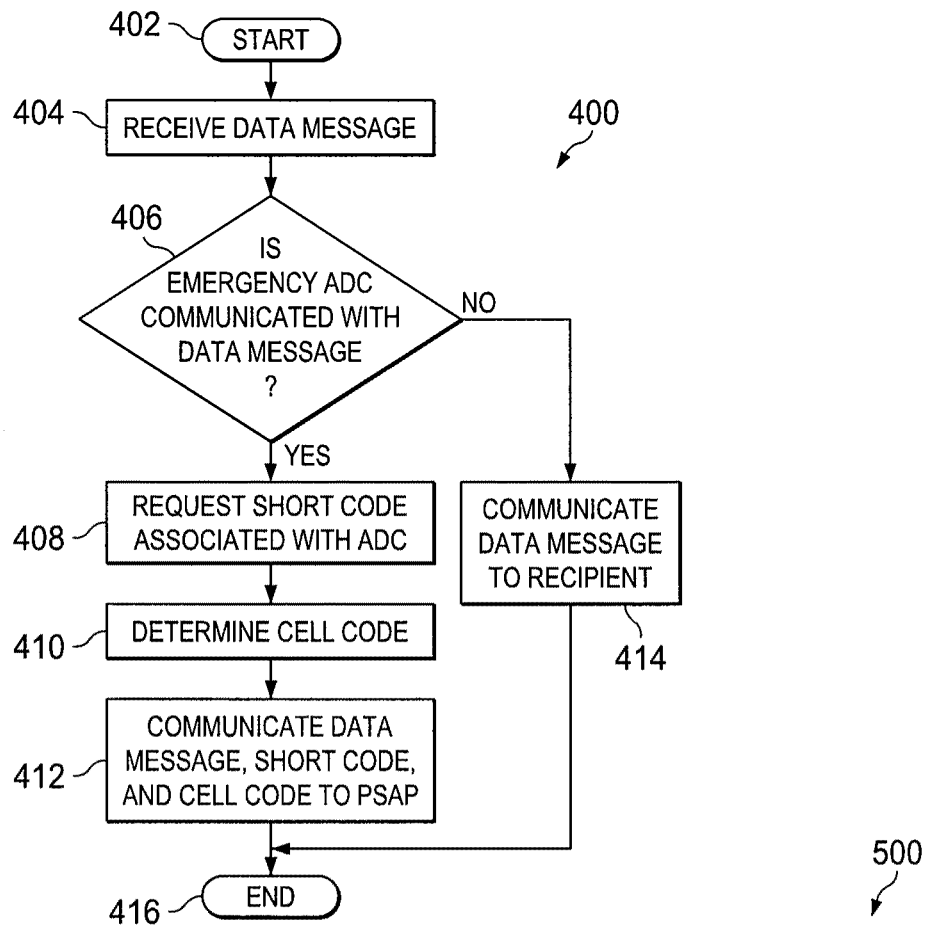
FIG. 4 is a flow diagram of an illustrative process for a mobile switching center to receive and process emergency data messages.

With regard to FIG. 4, an illustrative process 400 of a system identifying an emergency data message is provided. The process 400 starts at step 402. At step 404, a data message is received. The data message may be a text message, instant message, email, or any other data message that may be communicated from a wireless communications device. At step 406, a determination may be made as to whether an emergency abbreviated dialing code is communicated with the data message. If so, then at step 408, a short code associated with the emergency abbreviated dialing code may be requested. In addition, a determination of a cell code in which the wireless communications device that communicated the emergency data message may be determined. The emergency data message, short code, and cell code may be communicated to a PSAP at step 412. In communicating to the PSAP, the information, including the emergency data message, short code, and cell code, is communicated via a communications network to a network address for determining a PSAP local to a user who sent the emergency data message. If, at step 406, an emergency abbreviated dialing code is not communicated with the data message, then at step 414, the data message is communicated to a recipient, as understood in the art. The process ends at step 416.

Figure 5:
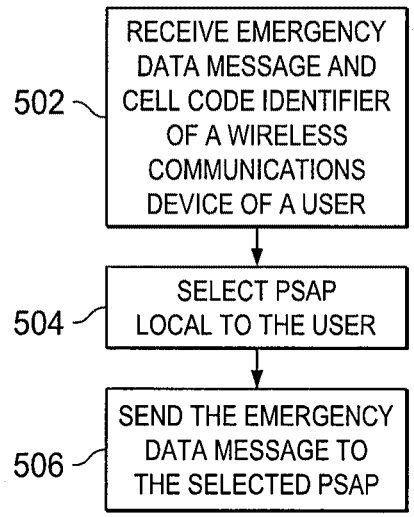
FIG. 5 is a flow diagram of an illustrative process for selecting a PSAP local to a user who sent an emergency data message.

With regard to FIG. 5, an illustrative process 500 may be performed by a PSAP capabilities defining system, which may be in communication with an emergency data message router. At step 502, an emergency data message, NID, and cell code identifier of a wireless communications device of a user may be received. In addition, a mobile directory number may also be received. At step 504, a PSAP local to the user may be selected. In selecting the local PSAP, a determination of the communications capabilities at one or more PSAPs local to the user may be determined using the cell code identifier and/or mobile directory number so as to determine which PSAP is nearest the user that has communications capabilities that are most compatible with the format of the emergency data message. At step 506, the emergency data message may be sent to the selected PSAP.

Figure 6:
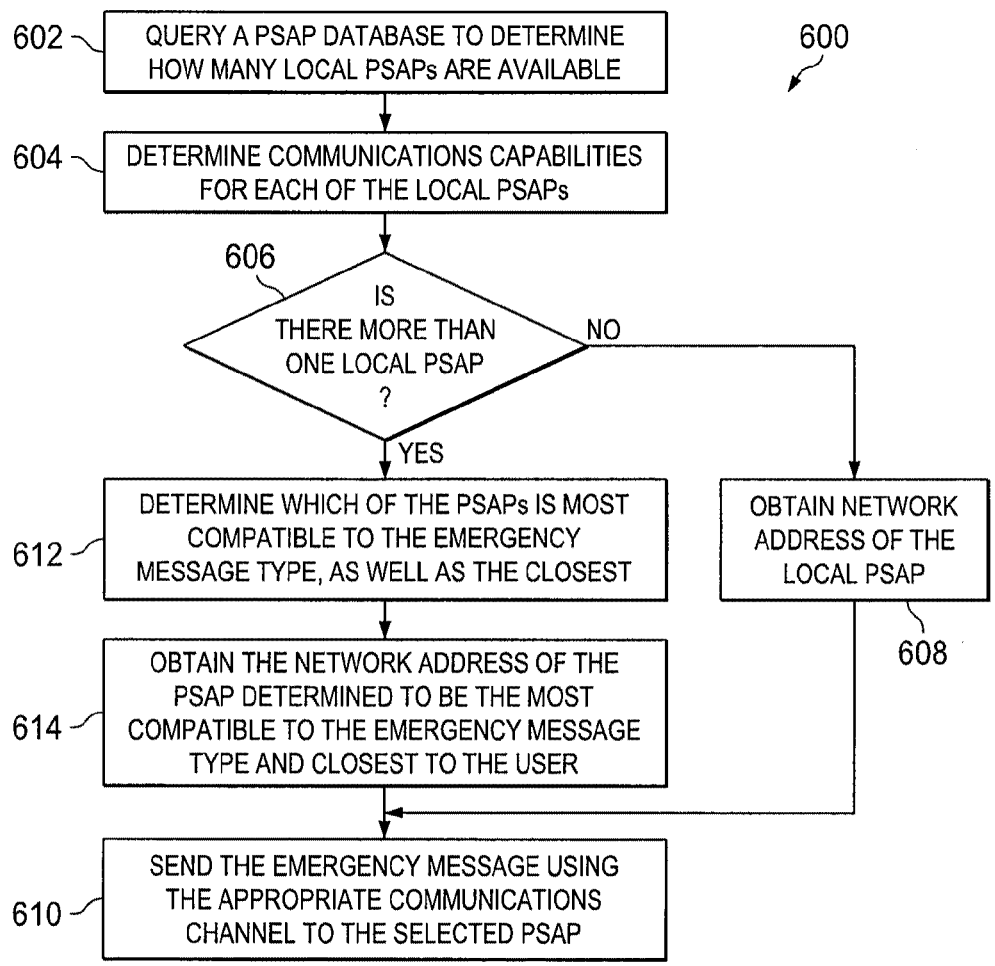
FIG. 6 is a flow diagram of a more detailed illustrative process for determining a PSAP local to a user who sent an emergency data message based on PSAP distance from the user and communications capabilities of the local PSAPs.

With regard to FIG. 6, a more detailed process 600 for determining to which PSAP to communicate an emergency data message is provided. At step 602, a query of a PSAP database may be made to determine how many local PSAPs are available with respect to a user who communicates an emergency data message. At step 604, a determination as to communications capabilities of each of the local PSAPs may be made. The determination may include determining the types of data messages that may be received by each of the PSAPs and communications networks to which the PSAPs are in communication. At step 606, a determination may be made as to whether there are more than one local PSAP. If not, then at step 608, a network address, such as a telephone number, IP address, or otherwise, of the local PSAP may be obtained. At step 610, the emergency data message may be sent to the PSAP using the appropriate communications channel. For example, in the event that the emergency data message is a text message, then if the network address of the local PSAP is a telephone number that is operating on a mobile communications system, then the emergency data message may be communicated over the mobile communications system to the PSAP.

If at step 606, a determination is made that more than one local PSAP is available, then at step 612, a determination as to which of the PSAPs the emergency data message type is most compatible and closest to the user who sent the emergency data message. At step 614, a network address of the PSAP determined to be the most compatible to the emergency data message type and closest to the user may be obtained. Although it may be desirable to identify the closest PSAP to the user and send the emergency data message to that PSAP, if the PSAP does not have communications capabilities to receive the emergency data message, then it may be as or more beneficial to find a PSAP that is further from the user and has the communications capabilities that accommodates the type of emergency data message that was sent so that an operator at the PSAP can handle the emergency request more efficiently. For example, if a PSAP is close to a user, but does not have text messaging capabilities and another PSAP which may be a few miles farther than the user but does have text messaging capabilities, then the emergency data message may be better communicated to the PSAP farther away even though the text message may be communicated to a text-to-speech system that may convert the information in the emergency text message for audible play to an operator at the closer PSAP. If no local PSAPs have text messaging capabilities, an emergency text message may be communicated to a text-to-speech converter so that the synthesized speech can be routed to a PSAP closest to the user. The process 600 continues at step 610, where the emergency data message is communicated to the selected PSAP.

Figure 7:
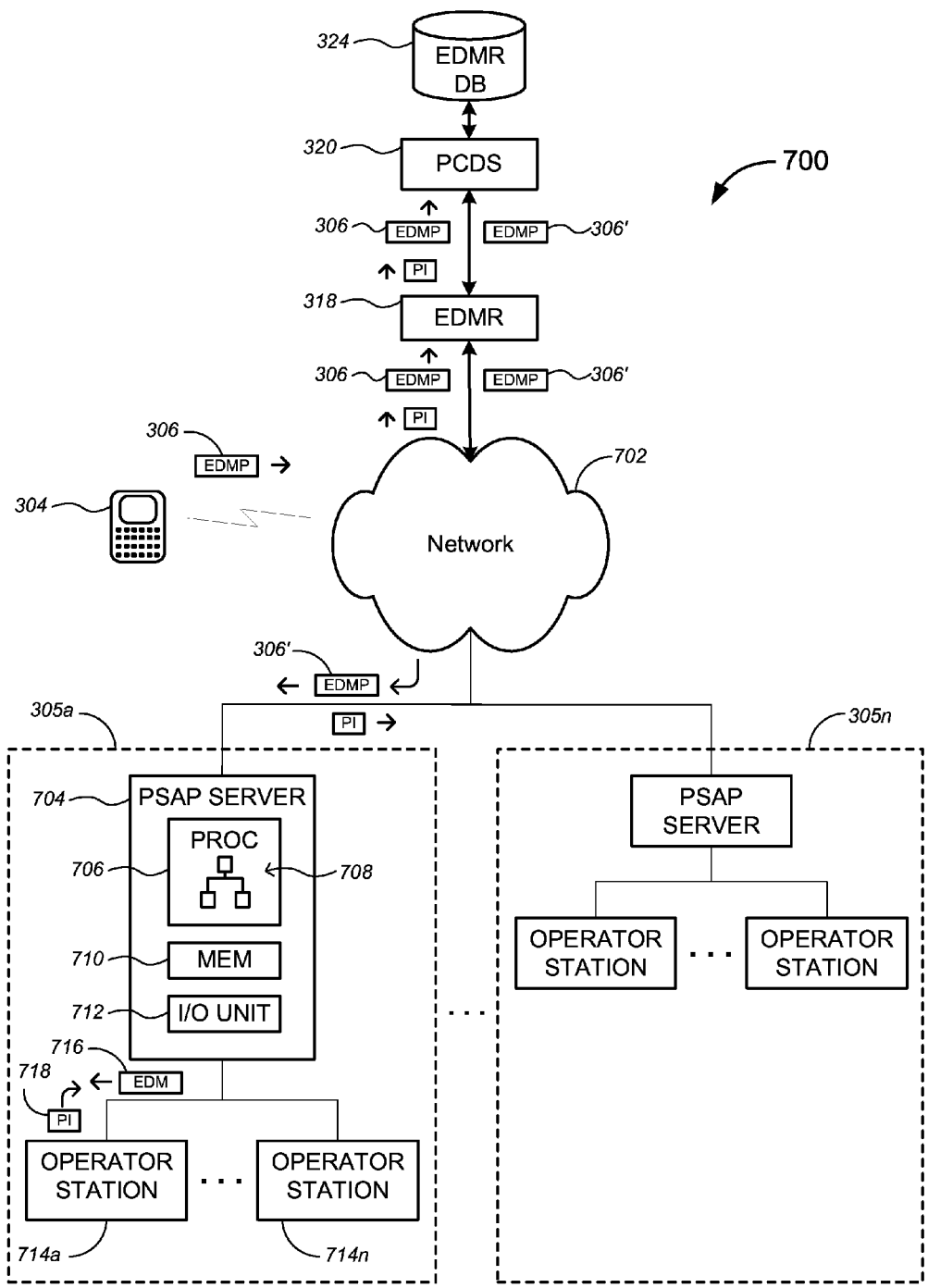
FIG. 7 is a block diagram of an illustrative network environment in which emergency data messages may be distributed to PSAPs in a balanced manner.

With regard to FIG. 7, an illustration of a network environment 700 similar to that of FIG. 3, including the PCDS 320 and PSAPs 305a-305n (collectively 305), is shown. A network 702 is configured to receive the emergency data message package 306 from the wireless communications device 304 and route the EDMP 306 to the emergency data message router 318, which may have a network address, such as internet domain name '911.911', so as to be easy for users to remember. The EDMR 318 may parse the EDMP 306 to select parameters, such as cell code and mobile directory number, to communicate to the PCDS 320. Alternatively, the entire EDMP 306 may be communicated to the PCDS 320. The PCDS 320 may identify one or more PSAPs local to the wireless communications device 304 and configured to receive emergency data messages of the same type as the emergency data message being communicated is classified (e.g., SMS text message), as previously described. In one embodiment, the PCDS is configured to distribute the emergency data messages based on capacity utilization of each of the identified PSAPs.

The EDMP 306' is communicated to a selected PSAP 305a. The PSAP 305a includes a PSAP server 704 includes a processing unit 706 and software 708 that may be configured to receive and process the EDMP 306'. The PSAP server 704 may also include memory 710 for storing data and I/O unit 712 for communicating data over the network 702 and with operator stations 714a-714n (collectively 714). In processing the EDMP 306', the software 708 may be configured to manage distribution of an emergency data message 716 to the operator stations 714. Selection of an operator station may be based on a variety of factors, including determining the configuration of each of the operator stations 714 to determine which can handle the type of emergency data message received, number of emergency data messages distributed to each of the operator stations 714, pending emergency data messages to be processed at each of the operator stations 714, average rate at which each emergency data message is being processed at each of the operator stations 714, and so on. Selection of the operator station may be made to balance the number of emergency data messages, to minimize waiting time for response to each of the emergency data messages, or to maximize utilization of each operator at the PSAP, for example.

The emergency data message 716 may be processed by the software 708 for distribution to operator stations 714 that are limited to receiving emergency data messages. Alternatively, the emergency data message 716 may be distributed to operator stations 714 that are configured to handle both emergency data messages and emergency telephone calls. The operator stations 714 may enable the operator to respond to the emergency data message 716 by communicating a text message, email message, or any other type of message that is the same or analogous to the classification of the emergency data message 716. In processing the emergency data message 716, the operator at the telecommunicator position may use a pre-scripted TDD/TTY or any other protocol message for responding to the sender of the emergency data message 716. After the operator has processed or handled the emergency data message, an archive of the emergency data message 716, map coordinates, geographic coordinates of the user, other information associated with processing the emergency data message 716, and response thereto, may be generated and saved by the software 708 at the PSAP for later retrieval, if desired.

In addition to selecting operator stations and distributing emergency data messages thereto, the software 708 of the PSAP server 704 may be configured to receive an emergency data message processed indicator 618 from the operator stations in response to the emergency data messages being processed. The PSAP server 704 may communicate each processed indicator 618 to the EDMR 318 to provide the PCDS 320 with notice so as to track statistics of performance of each of the PSAPs 305. The processed indicator 618 may include information, such as MDN, so that the PCDS 320 can identify which emergency data messages have been processed to update the historical information stored thereat. It should be understood that rather than sending a processed indicator that the PSAP server 704 may maintain statistical information for the PCDS 320 to request or for "pushing" to the PCDS 320 to maintain an up-to-date status of each PSAP (e.g., 50%, 80%, 100%, 120% capacity utilization) or a status indicator (e.g., "available," "maximum capacity," "over capacity").

Figure 8:
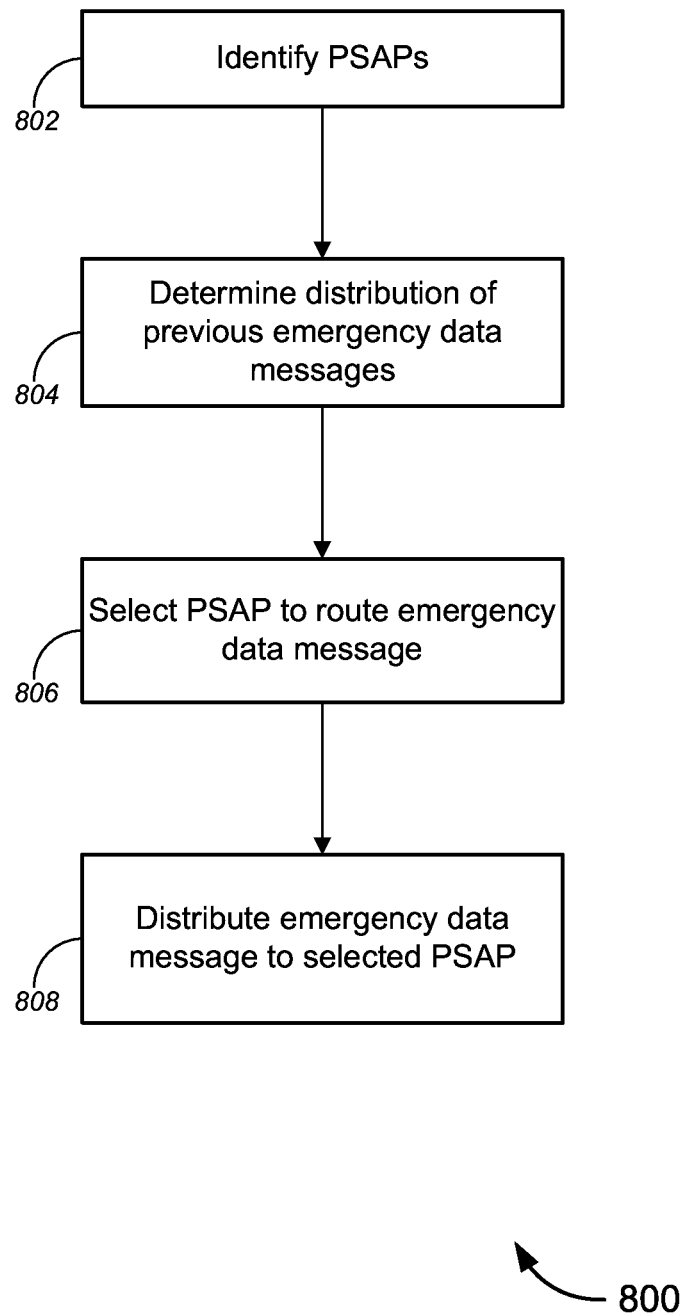
FIG. 8 is a flow diagram of an illustrative process for distributing emergency data messages to PSAPs in a balanced manner.

With regard to FIG. 8, an illustrative process 800 may be utilized by a PCDS or other network device to distribute emergency data messages to PSAPs. At step 802, PSAPs local to the user and configured to receive emergency data messages may be identified. The PSAPs may be identified by a cell code, mobile directory number, or other identifier(s) associated with a wireless communications device that communicated an emergency data message. At step 804, distribution of previous emergency data messages to the identified PSAPs may be determined. The distribution of previous emergency data messages may be from historical information stored at the PCDS. At step 806, based on the distribution of previous emergency data messages to the identified PSAPs, one of the identified PSAPs to route the emergency data message may be selected. In selecting the PSAP, information indicative of capacity utilization, volume of emergency data messages previously sent to the identified PSAPs, or other historical information factors may be used in routing the emergency data message to the selected PSAP. The emergency data message may be distributed to the selected PSAP at step 808.

Although the principles of the present have primarily been described with regard to wireless communications devices, it should be understood that wired communications devices, including wired/wireless computers, may be adapted to include emergency messaging, as described herein. One or more buttons or other initiation devices may be provided on the wired communications devices to generate and communicate an emergency data message to a network location for routing to a PSAP local to the user. In adapting the wired communications devices, software may be included in the devices to generate and communicate an emergency data message (e.g., text message or email) using a communications protocol that is capable of being communicated over the communications network (e.g., public switched telephone network, cable network, Internet), as understood in the art. Information specific to the user, location of the user, or otherwise may be included in the emergency data message. For example, name, address, number of people in residence, photograph, medical conditions, or any other information may be pre-established for retrieval and inclusion in the emergency data message, thereby providing information to an operator at a PSAP to provide emergency personnel, such as police, firemen, or medical personnel.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A system for routing emergency data messages to public safety answering points (PSAPs), said system comprising:
   a memory;
   an input/output (I/O) unit;
   a processing unit in communication with said memory and I/O unit, and configured to:
      receive an emergency data message and cell code identifier indicative of a location of a wireless communications device of a user, wherein the received emergency data message is of a data message type including at least one of text message, instant message (IM), email, photo message, and video message;
      identify PSAPs local to the user and configured to receive emergency data messages, wherein said emergency data messages are of a data message type including at least one of text message, instant message (IM), email, photo message, and video message;
      determine whether the capabilities of the identified PSAPs local to the user are matched with the data message type of the received emergency data message;
      based on the determination of whether the capabilities of the identified PSAPs local to the user are matched with the data message type of the received emergency data message, select one of the identified PSAPs to route the received emergency data message;
      route the received emergency data message to the selected PSAP;
      store historical information of emergency data messages communicated to PSAPs in said memory, the historical information including distribution of the emergency data messages;
      access the historical information stored in said memory;
      update the historical information stored in said memory after routing the emergency data message to the selected PSAP;
      receive data from respective PSAPs to which the emergency data messages were sent indicating that the emergency data messages were processed; and
      update the historical information in said memory to include information reflective of the processed emergency data from the respective PSAPs;
      generate a processed emergency data message per time unit statistical value; and
      route the emergency data message based on the processed emergency data message per time unit statistical value.

2. The system according to claim 1, wherein said processing unit is configured to select the PSAP to balance distribution of the emergency data messages among the identified PSAPs.

3. The system according to claim 1, wherein said processing unit is configured to select the PSAP based on number of operator stations configured to receive a type of emergency data message of which is the emergency data message at each of the identified PSAPs.

4. The system according to claim 3, wherein the processing unit is configured to balance the number of emergency data messages based on an average defined by the emergency data messages on a per operator station at each PSAP basis.

5. A method for routing emergency data messages to public safety answering points (PSAPs), said method comprising:
   identifying PSAPs local to the user and configured to receive emergency data messages, wherein said emergency data messages are of a data message type including at least one of text message, instant message (IM), email, photo message, and video message;
   determining whether the capabilities of the identified PSAPs local to the user are matched with the data message type of a received emergency data message, wherein said received emergency data message is of a data message type including at least one of text message, instant message (IM), email, photo message, and video message;

based on the determination of whether the capabilities of the identified PSAPs local to the user are matched with the data message type of the received emergency data message, selecting one of the identified PSAPs to route the received emergency data message;

routing the received emergency data message to the selected PSAP;

storing historical information of emergency data messages communicated to PSAPs in said memory, the historical information including distribution of the emergency data messages;

accessing the historical information stored in said memory;

updating the historical information stored in said memory after routing the emergency data message to the selected PSAP;

receiving data from respective PSAPs to which the emergency data messages were sent indicating that the emergency data messages were processed; and updating the historical information in said memory to include information reflective of the processed emergency data from the respective PSAPs;

generating a processed emergency data message per time unit statistical value; and routing the emergency data message based on the processed emergency data message per time unit statistical value.

6. The method according to claim 5, wherein selecting includes selecting the PSAP to balance distribution of the emergency data messages among the identified PSAPs.

7. The method according to claim 5, wherein selecting includes selecting the PSAP based on number of operator stations at each of the identified PSAPs configured to receive a type of emergency data message of which the emergency data message is categorized.

8. The method according to claim 7, further comprising balancing the number of emergency data messages sent to the PSAPs based on an average defined by the emergency data messages on a per operator station at each PSAP basis.

9. A method for distributing emergency data messages at a PSAP, said method comprising:

receiving an emergency data message at a PSAP, wherein the received emergency data message is of a data message type including at least one of text message, instant message (IM), email, photo message, and video message;

determining distribution based on the data message type of emergency data messages to operator stations configured to handle the emergency data message type of which the received emergency data message is classified;

selecting one of the operator stations based on the determined distribution to distribute the received emergency data message; and distributing the received emergency data message based on the data message type to the selected operator station.

10. The method according to claim 9, wherein distributing the emergency data message includes:

determining how many emergency data messages have been distributed to each operator station; and selecting the operator station to distribute the emergency data message to balance a number of emergency data messages sent to each operator station.

11. The method according to claim 9, further comprising:

determining a rate at which emergency data messages are being processed at each operator station; and selecting the operator station to route the emergency data message based on a rate at which emergency data messages are being processed at each operator station and a number of emergency data messages in respective queues at each operator station.

12. The method according to claim 9, further comprising: communicating statistical information to a network node in response to processing emergency data messages received from the network node, the statistical information including an indication of at least one emergency data message being processed.

* * * * *